May 19, 1931.  C. R. BENZEL  1,805,865
CULTIVATOR ATTACHMENT
Filed Dec. 23, 1929
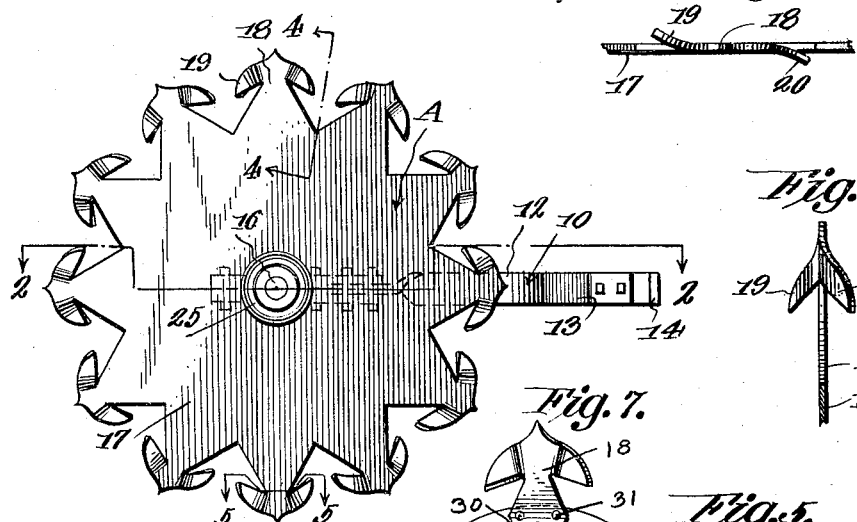
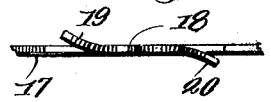
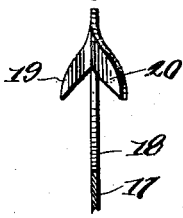
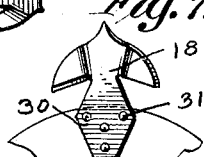
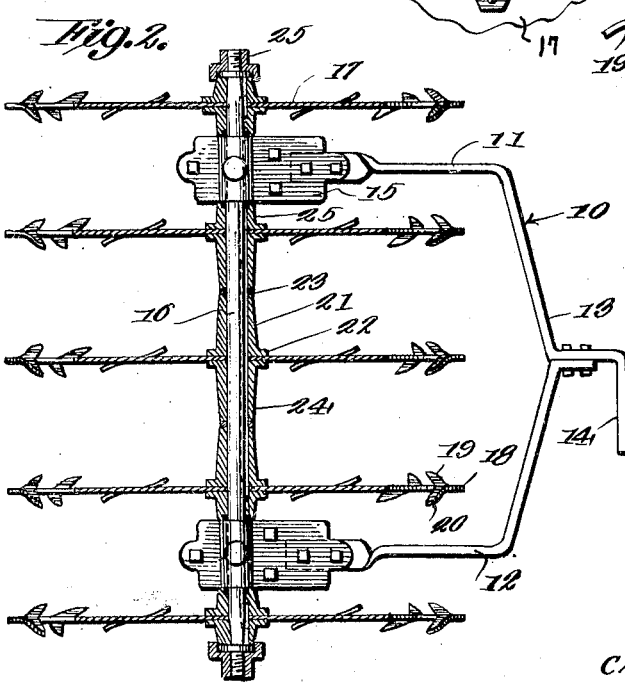
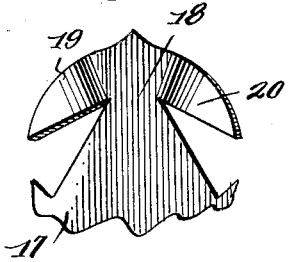
Inventor
CARL R. BENZEL
By Irving L. McCathran
Attorney Patented May 19, 1931

1,805,865

UNITED STATES PATENT OFFICE

CARL R. BENZEL, OF GREELEY, COLORADO

CULTIVATOR ATTACHMENT

Application filed December 23, 1929. Serial No. 416,046.

This invention appertains to farming machinery and more particularly to a cultivator attachment particularly susceptible for use with beet cultivators.

One of the primary objects of my invention is the provision of a novel cultivator attachment for taking the place of the usual cultivator blades and which will permit the effective drawing of the cultivator between the rows of growing plants without undue strain on the cultivator or draft animals and which will effectively mulch and soften the ground between the rows without injury to the plants.

Another important object of my invention is to provide a cultivator embodying a frame for connection with the ordinary cultivator frame having a rotatable axle with a plurality of novel ground working discs thereon, the discs having means formed on the peripheries thereof for cutting and braking the ground upon the entrance thereof into the ground and for breaking and tearing the ground on the exit thereof from the ground.

A further object of my invention is to provide a novel cultivator disc embodying a substantially star shaped body having working blades or teeth on the opposite sides of the points thereof, the blades being bent in opposite direction for the effective working of the ground both on the entrance and exit of the points into and from the ground.

A further object of my invention is the provision of novel means for mounting the cutting discs on the axle whereby the same will be held in proper spaced relation relative to one another, and held against twisting movement.

A still further object of my invention is to provide an improved attachment for cultivators of the above character, which is durable and efficient in use, one that is simple and easy to manufacture, and one which can be placed upon the market and incorporated with a conventional cultivator frame at a low cost.

With these and other objects in view, the invention consists in the novel construction, arrangement and formation of parts as will be hereinafter more specifically described, claimed, and illustrated in the accompanying drawings, in which drawings:—

Figure 1 is a side elevation of my improved cultivator attachment.

Figure 2 is a horizontal section through the same taken on the line 2—2 of Figure 1 looking in the direction of the arrows.

Figure 3 is a fragmentary edge view of one of the cultivator blades or discs showing one of the novel penetrating points carried thereby.

Figure 4 is a detail section taken on the line 4—4 of Figure 1 looking in the direction of the arrows illustrating one of my novel penetrating points.

Figure 5 is a detail section taken through one of the penetrating points on the line 5—5 of Figure 1 looking in the direction of the arrows and showing the oppositely bent wings formed on the opposite sides of the points, and Figure 6 is a fragmentary side elevation of one of the cultivator discs or blades illustrating in detail one of my improved penetrating points showing the oppositely extending cutting blades.

Figure 7 is a fragmentary side elevation of one of the cultivator discs or blades illustrating in detail a modified form of the discs in which the penetrating point is made detachable from the body of the disc.

Referring to the drawings in detail, wherein similar reference characters designate corresponding parts throughout the several views, the letter A generally indicates my improved cultivator attachment which comprises the attaching frame 5, which can be of a substantially U-shape in plan. This attaching frame includes the side legs 11 and 12 and the connecting bight or cross bar portions 12 to which can be connected the attaching foot 14 for connection with the cultivator frame (not shown). The ends of the legs or side bars 11 and 12 support bearings 15 for the reception of the axle or shaft 16. Mounted for rotary movement with the axle or shaft 16 are my novel cultivator discs or blades 17 and it is to be noted that these blades or discs 17 are uniformly spaced. The bearings 15 carried by the attaching frame are arranged inward of the terminals of the axle and thus intermediate discs or cultivator blades are provided between the arms or side bars 11 and 12 and end discs or cultivator blades are provided on each side of the side bars 11 and 12.

These discs 17 can be considered as of a star shape in that their peripheries are provided with a plurality of radially extending ground penetrating working points 18. Each of these points adjacent to the outer end thereof are provided on their opposite sides with cutting blades 19 and 20. These blades 19 and 20 are bent laterally in opposite directions from the faces of the disc, so as to permit the cutting and the tearing of the ground both on the entrance and exit of the points into and out of the ground.

The discs 17 are mounted on the axle in a novel manner and it is to be noted that between each of the discs I employ hub sleeves 21. The outer ends of the hub sleeves 21 are provided with enlarged bearing ends 22 for engaging the opposite face of the discs while the meeting ends of the hub sleeves receive a wear washer 23 therebetween. The discs and the hub sleeves are held on the axle for rotation therewith by the use of suitable keys 23, as shown, but other similar holding means can be employed. It is to also be noted that I provide relatively short bearing sleeves 25 for the discs between the discs and the bearings 15 and the terminals of the axle or shaft 16 can be threaded for the reception of the cap nuts 25 which hold the parts in assembled position.

It is obvious that more or less of my discs 17 can be employed according to the character of the cultivator machine with which the attachment is used and according to the width of the rows, and that more than one gang of my discs can be used on one cultivator machine.

As shown in Figure 7 of the drawings, the penetrating points may be made detachable from the body portion of the disc or blade and as shown, the penetrating points 18, in this instance, include attaching body portions 30 which can be bolted or otherwise secured as at 31 to the body portion 17 of the disc.

Changes in details may be made without departing from the spirit or the scope of this invention, but:—

What I claim as new is:

1. An attachment for cultivators comprising an attaching frame, an axle rotatably carried by said frame, a plurality of uniformly spaced ground working discs secured to the axle for movement therewith, a plurality of radially extending ground penetrating points on the periphery of each disc, and ground working blades carried by the opposite sides of each point.

2. An attachment for cultivators comprising an attaching frame, an axle on said frame, a plurality of spaced ground working discs on the axle, radially extending peripheral ground penetrating points on the discs, and oppositely extending blades formed on the sides of each penetrating point and extending laterally in opposite directions from the opposite faces of the discs.

3. A cultivator disc comprising a flat body having a plurality of peripheral radially extending penetrating ground points, blades formed on the opposite sides of the points, said blades being struck laterally in opposite directions from the opposite sides of the body.

In testimony whereof I affix my signature.

CARL R. BENZEL.